(12) United States Patent
Belser

(10) Patent No.: US 7,597,042 B2
(45) Date of Patent: Oct. 6, 2009

(54) AXIAL PISTON MACHINE

(75) Inventor: Roland Belser, Haigerloch (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 287 days.

(21) Appl. No.: 10/578,814

(22) PCT Filed: Oct. 22, 2004

(86) PCT No.: PCT/EP2004/011988

§ 371 (c)(1),
(2), (4) Date: Apr. 5, 2007

(87) PCT Pub. No.: WO2005/047654

PCT Pub. Date: May 26, 2005

(65) Prior Publication Data

US 2008/0236384 A1 Oct. 2, 2008

(30) Foreign Application Priority Data

Nov. 4, 2003 (DE) .................................. 103 51 473

(51) Int. Cl.
*F01B 3/00* (2006.01)
*F04B 1/20* (2006.01)

(52) U.S. Cl. ............................................... 92/71; 92/57

(58) Field of Classification Search ................. 92/71, 92/57, 132
See application file for complete search history.

(56) References Cited

U.S. PATENT DOCUMENTS 2,331,694 A * 10/1943 Jeffrey et al. ............... 91/486
3,636,821 A   1/1972 Rystrom
6,196,109 B1  3/2001 Zumbusch et al.

FOREIGN PATENT DOCUMENTS

| DE | 28 53 493     | 6/1979 |
| DE | 44 23 023 A1  | 1/1996 |
| DE | 299 20 632 U1 | 5/2001 |
| GB | 622346        | 4/1949 |

* cited by examiner

*Primary Examiner*—Thomas E Lazo
(74) *Attorney, Agent, or Firm*—Scully, Scott, Murphy & Presser, P.C.

(57) ABSTRACT

The invention relates to an axial position machine (1) comprising cylinder bores (9) that are located in a cylinder drum (4), pistons (10) that can be axially displaced in said boxes (9) and helical compression springs (22) that are provided in the cylinder bores (9). Each piston (10) is pre-stressed against a swash plate (22), which is supported on the cylinder drum (4). The diameter of the helical compression spring (22) narrows (23) between the upper and lower ends.

12 Claims, 1 Drawing Sheet

AXIAL PISTON MACHINE

Figure 1:
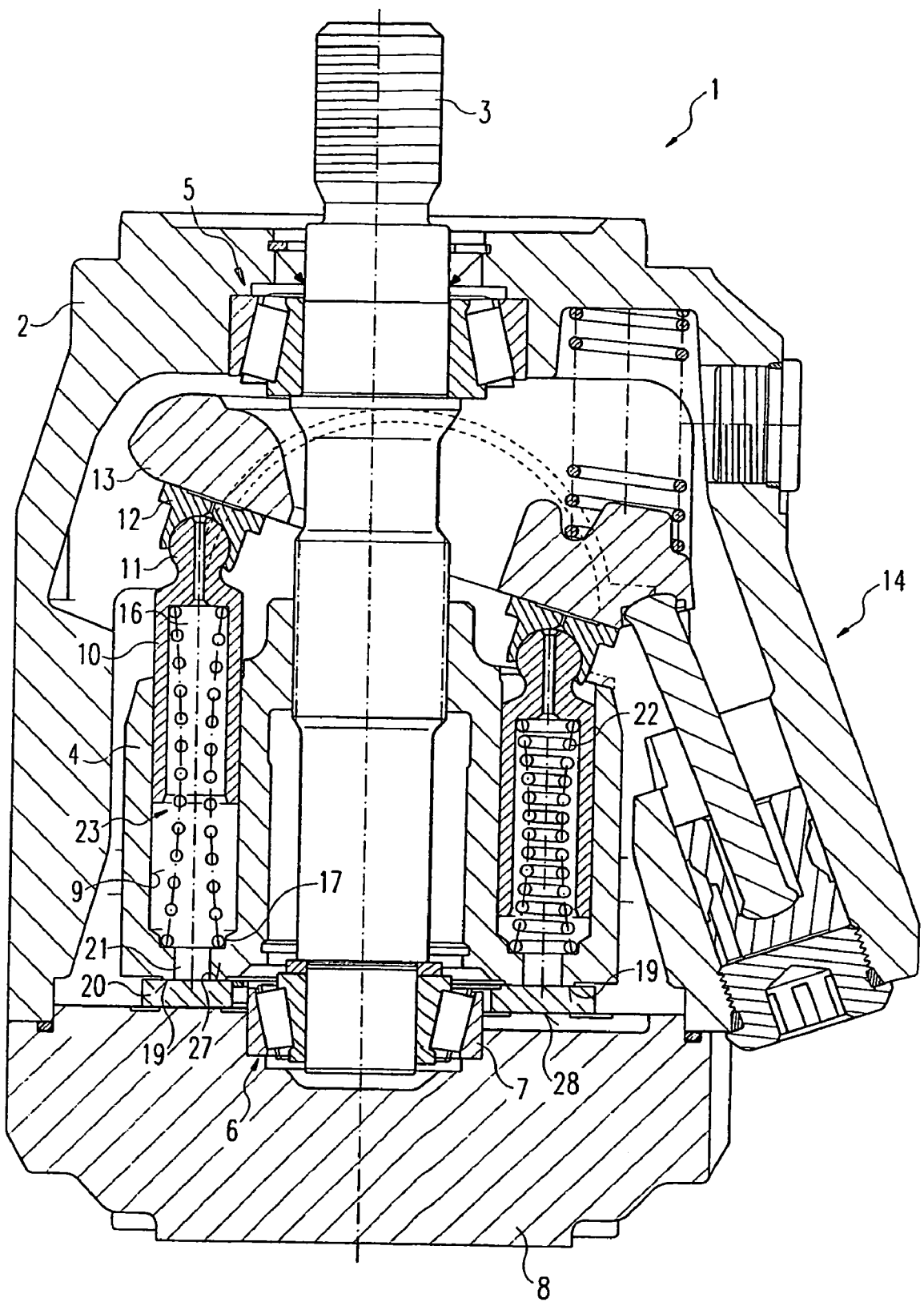

The invention takes as its starting point an axial piston machine of the type in the main claim.

For example, DE 44 23 023 A1 discloses an axial piston machine in a swash plate design with an adjustable displacement volume. The hydrostatic machine described therein uses a spring which is arranged centred about the driving shaft and which, by way of a retention ball constructed as a holding-down device and a retention plate, is provided for pre-stressing the slide block against a slide plate and the swash plate and the cylinder drum against the control plate in order to hold these components in close contact at different angles of inclination of the swash plate during operation. The disadvantage here is the excessively complex construction due mainly to the use of the retention ball and the retention plate.

A hydrostatic machine of a more simple construction takes DE 28 53 493 A1 as its starting point. The axial piston machine in a swash plate design described therein uses helical compression springs arranged in the cylinders instead of the retention plate and the retention ball extending around the driving axis. The helical compression springs have a constant diameter and are therefore of a cylindrical construction. The cylindrical helical springs are supported, on the one hand, in the region around the openings towards the control plate and, on the other, against the piston base of the piston arranged in the cylinders.

The prior art revealed in DE 28 53 493 A1 is disadvantageous in that, at an appropriate speed of the cylinder drum, the cylindrical helical compression springs come into contact either with the radial inner walls of the piston or with the cylinder walls as a result of the centrifugal forces, particularly in the region of the spring centre. Owing to the resultant friction, the cylindrical helical compression springs and the walls are subject to a much greater degree of wear. This greatly reduces the service life and the reliability of the axial piston machine.

The object of the invention is to provide a simply constructed axial piston machine which is reliable in operation, can be built economically and is subject to little wear.

The object is achieved according to the invention in that, instead of the cylindrical helical compression springs, helical compression springs with a reduction in diameter are used, which reduce the diameter of the outer contour of the helical compression spring. This reliably and permanently prevents the helical compression springs, particularly the centre of the helical compression springs, from coming into contact with the walls of the cylinder or the piston interior, even when high centrifugal forces are in effect.

The measures described in the subclaims relate to advantageous further developments of the invention.

It is particularly advantageous to reduce the diameter of the course of the outer contour of the helical compression spring in a radially symmetrical circle at each point of the centre axis. The helical compression spring can thus be built particularly simply and manufactured particularly economically. This also applies when the reduction in diameter is arranged coaxially with the centre axis.

It is moreover advantageous if the reduction in diameter reduces the course of the outer contour of the helical compression spring concavely. The resultant concave or waisted helical compression spring is easy to manufacture.

It is furthermore advantageous if the reduction in diameter reduces the course of the outer contour of the helical compression spring most greatly at the height of the centre of the helical compression spring. The stability of the helical compression spring with respect to radially acting forces is thus substantially maintained and is distributed uniformly over the course of the helical compression spring along both sides, starting from the height of the centre. The same effect is achieved by providing the reduction in diameter from the upper end to the lower end of the helical compression spring.

It is furthermore advantageous if the cylinder drum is pre-stressed against the control plate by the helical compression spring. This enables an altogether substantially more simple construction of the axial piston machine.

A preferred embodiment of the axial piston machine according to the invention is illustrated in the drawing and explained in more detail in the description below. The drawing shows:

FIG. 1 a schematic illustration of an exemplary embodiment of an axial piston machine according to the invention.

The axial piston machine 1 illustrated in FIG. 1 is constructed in a swash plate design with an adjustable displacement volume and one flow direction and, in known manner, comprises as essential components a substantially hollow cylindrical housing 2 with an end which is open at the end face (lower end in FIG. 1), a housing cover 8 which is fixed to the housing 2 and closes its open end, a swash plate 13 which is also known as a stroke plate, a control plate 20, a shaft 3 and a cylinder drum 4.

The shaft 3 is rotatably mounted in the housing 2 and reaches through the cylinder drum 4 in centred manner. The cylinder drum 4 is connected, for example by a keyway connection, to the shaft 3 in such a way that it is non-rotatable and yet axially movable and can thus be pulled off the shaft. The shaft 3 is mounted in a respective rolling bearing 5 and 6 on both sides of the cylinder drum 4. The rolling bearing 6 has an outer bearing ring 7 which is inserted in a corresponding cutout in the housing cover 8.

A plurality of cylinder bores 9 are constructed in the cylinder drum 4, distributed over the circumference, with the centre axes of the cylinder bores 9 extending parallel to the centre axis of the shaft 3, it being possible to insert bearing bushes (not illustrated) for example in the cylinder bores 9. A respective piston 10 is axially movably inserted in each cylinder bore 9 in axially displaceable manner. The pistons 10 each have, at the side remote from the housing cover 8, a spherical head 11 which cooperates with a corresponding cutout in a slide block 12 to form a hinge joint. The piston 10 is supported against the swash plate 13 by means of the slide block 12. The pistons 10 therefore execute a stroke movement in the cylinder bores 9 upon a rotation of the cylinder drum 4. The length of the stroke here is determined by the position of the swash plate 13, with the position of the swash plate 13 in the exemplary embodiment being adjustable by an adjusting device 14.

The control openings of the control plate 20, which are not shown in the section of the axial piston machine 1 illustrated in FIG. 1, are in permanent contact with at least one high pressure or low pressure connection (not illustrated) on their side remote from the cylinder drum 4.

The cylinder bores 9 are open towards the end face 19 of the cylinder drum 4 by way of openings 21. Upon a rotation of the cylinder drum 4, the openings 21 pass over a sealing surrounding area 27 of the control plate 20 and are thus connected alternately to the control openings (not shown) during one revolution. The end face 19 and the sealing surrounding area 27 lying adjacent thereto in sealing manner can also be constructed to have a corresponding spherical form.

The control plate 20 is supported against the housing cover 8 in the axial direction. To prevent leakage, the control plate 20 has a further sealing surrounding area 28 which is constructed on the side of the control plate 20 that is remote from the cylinder drum 4 and which cooperates with the surface of the housing cover 8 in sealing manner.

The functioning of the axial piston machine 1 described above is generally known and, in the description below, is restricted to the essential aspects when used as a pump.

The axial piston machine 1 is provided for example to operate with oil as the fluid. The cylinder drum 4 together with the pistons 10 is set in rotation by way of the shaft 3. When, by actuating the adjusting device 14, the swash plate 13 is pivoted into an inclined position with respect to the cylinder drum 4, all of the pistons 10 execute stroke movements. Upon rotation of the cylinder drum 4 through 360°, each piston 10 executes a suction and a compression stroke, thereby generating corresponding oil flows which are supplied and discharged by way of the openings 21, the control openings (not shown) in the control plate 20 and the high pressure and low pressure connection (not illustrated).

The pistons 10 which are guided axially in the cylinder bores 9 are pre-stressed or pressed against the swash plate 13 by a respective helical compression spring 22 which, in this exemplary embodiment, has a circular cross-section of the spring wire, so that the slide blocks 12 lie against the swash plate 13 in each operating state of the axial piston machine 1. In this exemplary embodiment, the pistons 10 have a cylindrical cutout 16 which is open towards the opening 21. The helical compression spring 22 reaches partially into the cutout 16 and is supported against the base of the cutout 16. Alternatively, the helical compression spring 22, which is made for example of spring steel and provided with a coating, is supported against the cylinder drum 4.

In the exemplary embodiment shown, the helical compression spring 22 is supported against the same side of the cylinder bore 9 on which the opening 21 is also arranged. In this exemplary embodiment, a step 17 is constructed inside the cylinder bore 9 around the opening 21, which step extends circularly around the opening 21 and has the corresponding end of the helical compression spring 22 engaging in fitting manner therein without narrowing the cross-section of the opening 21. The end of the helical compression spring 22 which lies in the step 17 can also be form-fittingly yet releasably secured in the axial direction against axial displacement or lifting by a corresponding construction of the step 17, for example by an overhang (not illustrated).

Since it is axially movable, the cylinder drum 4 is pressed against the control plate 20 as a result of the spring force of the helical compression springs 22.

According to the invention, the helical compression springs 22 are waisted or have a concave reduction in diameter 23. The reduction in diameter 23 reduces the diameter of the outer contour of the helical compression spring 22 in a centrally symmetrical circle, with the size of the diameter being smallest in the centre of the height of the helical compression spring 22. Depending on how far the helical compression spring 22 reaches into the cutout 16, the smallest diameter of the reduction in diameter 23 can be arranged at a different height of the helical compression spring 22, for example in the lower third close to the opening 21 or only slightly below the centre since, in the lower dead centre position in the embodiment shown, the outer contour of the helical compression spring 22 comes very close to the wall of the piston 10 at the lower end.

To prevent contact between the helical compression spring 22 and the inner walls of the piston 10, a cutout (not illustrated) arranged at the height of the centre of the helical compression springs 22 in the wall of the cutout 16 is also feasible. Although such a cutout would increase the distance between the helical compression spring 22 and the wall, it would however increase the manufacturing costs and reduce the stability of the construction. Thinner helical compression springs 22 would likewise increase the distance, although the openings 21 would then have to have smaller diameters to provide an adequate abutment face for the ends of the helical compression springs 22. This restricts the constructional possibilities for through-flow control considerably and, in particular, reduces the maximum pump capacity.

The invention is not restricted to axial piston machines 1 in a swash plate design and can also be used for example for axial piston machines in an angled-axis design.

The invention claimed is:

1. An axial piston machine with cylinder bores arranged in a cylinder drum, pistons which are axially movable in the cylinder bores and helical compression springs arranged in the cylinder bores, each said piston being pre-stressed against a swash plate by a respective single said helical compression spring which is supported against the cylinder drum, wherein each said spring has a reduction in diameter between the opposite ends thereof.

2. An axial piston machine according to claim 1, wherein each said helical compression spring has a reduction in diameter that reduces the diameter along the extent of the outer contour of the helical compression spring in a radially symmetrical circle at each point about the center axis of the helical compression spring.

3. An axial piston machine according to claim 1, wherein the reduction in diameter extends coaxially about the center axis of the helical compression spring.

4. An axial piston machine according to claim 1, wherein the reduction in diameter reduces concavely along the axial length of the outer contour of the helical compression spring.

5. An axial piston machine according to claim 1, wherein the reduction in diameter reduces the diameter of the outer contour of the helical compression spring most extensively at the center along the axial length between the opposite ends of the helical compression spring.

6. An axial piston machine according to claim 5, wherein the reduction in diameter extends continually between the opposite ends of the helical compression spring.

7. An axial piston machine according to claim 1, wherein the cylinder drum is pre-stressed against a control plate by the helical compression springs.

8. An axial piston machine according to claim 1, wherein each said helical compression spring is supported in the region around an opening of the cylinder bore, which is selectively connectable to a high pressure or low pressure connection.

9. An axial piston machine according to claim 1, wherein each said piston has a cutout which opens towards the cylinder bore.

10. An axial piston machine according to claim 9, wherein the cutout is cylindrical.

11. An axial piston machine according to claim 9, wherein each said helical compression spring is supported against the respective base of the cutout.

12. An axial piston machine according to claim 1, wherein each said helical compression spring is made from and/or coated with spring steel.

\* \* \* \* \*